Figure 1:
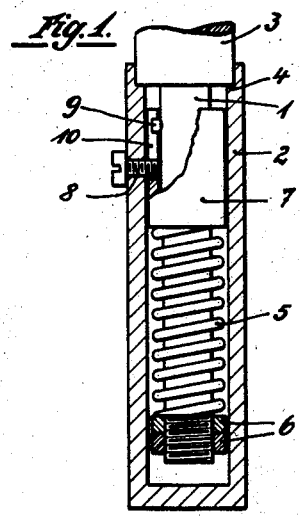

Aug. 22, 1933.  W. STAHLECKER  1,923,123
PLUG AND SOCKET CONNECTION
Filed Feb. 2, 1932   2 Sheets-Sheet 1

Inventor:
Wilhelm Stahlecker
by Hallenbach
Atty.

Aug. 22, 1933. W. STAHLECKER 1,923,123
PLUG AND SOCKET CONNECTION
Filed Feb. 2, 1932 2 Sheets-Sheet 2

Inventor:
Wilhelm Stahlecker
by Karl Weichsel
Atty.

Patented Aug. 22, 1933

1,923,123

UNITED STATES PATENT OFFICE 1,923,123

PLUG- AND SOCKET-CONNECTION

Wilhelm Stahlecker, Cannstatt, Germany, assignor to Vereinigte Kugellagerfabriken Aktiengesellschaft, Schweinfurt, Germany Application February 2, 1932, Serial No. 590,460, and in Germany November 21, 1931

8 Claims. (Cl. 287—119)

My invention relates to a plug- and socket-connection, i. e., a connection in which a normally cylindrical member is inserted coaxially in a normally cylindrical casing, and the cylindrical member which will be referred to as the "shaft", and the socket or casing are held against relative axial displacement in a given direction by resilient means.

It is an object of my invention to so design a connection of this type that tension is imparted to the spring before the parts are assembled. To this end I provide means, such as a shoulder on the shaft and a seat on the casing, for holding the shaft and the casing against axial displacement in a given direction. A spring is secured to the shaft at one end for keeping the shoulder engaged with the seat under resilient pressure so that the shaft and the casing may be moved with respect to each other against the action of the resilient means in the direction opposite to that in which they are held positively engaged by the spring reacting on the shoulder and the seat. Mounted to rotate and to slide on the shaft is a clutching sleeve, the free end of the spring bearing on the inner end of the sleeve. Means such as a pin on the casing and a slot in the sleeve, are provided for anchoring the sleeve against rotation and axial displacement with respect to the casing, and means such as a lug on the shaft adapted to enter the slot in the sleeve so as to permit axial displacement of the sleeve on the shaft, are provided. Before the parts are assembled, the clutching sleeve is pushed inwardly in loading the spring which may be a compression or tension spring, and the lug on the shaft is moved out of registering relation to the slot in the sleeve so that the sleeve is held against axial displacement on the shaft by the lug and the spring remains under tension. In this condition the shaft and the sleeve are inserted in the casing with the slot in the sleeve in line with the pin or the like for anchoring the sleeve on the casing, the pin is moved into the slot so that the casing and the sleeve are held against relative rotation, and the shaft and the casing are now rotated with respect to each other until the lug on the shaft registers with the slot in the clutching sleeve. The spring now pushes the sleeve in outward direction until the bottom of its slot engages the pin on the casing and holds the sleeve and the casing against relative axial displacement. The pressure of the spring is now transmitted to the casing through the anchoring means and holds the shoulder on the shaft and the seat on the casing engaged.

By providing means for imparting initial tension to the spring the novel connection eliminates the difficulties which are encountered if the load is put on the spring during, instead of before, the assembling of the parts. Considerable stress is exerted on the members of the connection which may cause damage. The risk of damage is particularly great if the shaft is a bearing sleeve for a spindle of a textile machine as in this case it is comparatively delicate and must not be subjected to excessive stress.

It has already been suggested to eliminate this drawback, but the problem has heretofore been solved by difficult operations or specially designed tools which is not satisfactory.

Another advantage offered by the new connection is that it can be assembled and disassembled if the casing is accessible from one end only, i. e., the casing may be concealed with the exception of the seat at its outer end without interfering with the assembling of the parts. This is of particular advantage if the shaft is the bearing sleeve of a spindle, because on the one hand it is necessary that the casing should be protected from foreign matter and moisture, while on the other hand leakage of lubricant from the casing must be avoided. Another advantage is that the means for regulating the spring pressure are concealed in the casing and protected against tampering from the outside.

The new connection is composed of only a small number of members of simple design which lend themselves to quantity production.

In the drawings affixed to this specification and forming part thereof several types of connections embodying my invention are illustrated diagrammatically by way of example.

In the drawings

Figure 2:
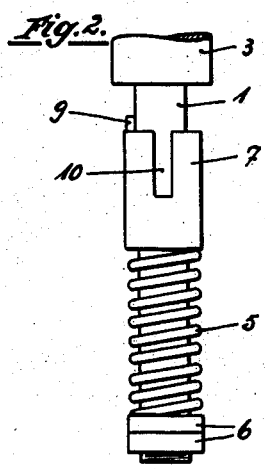
Figure 3:
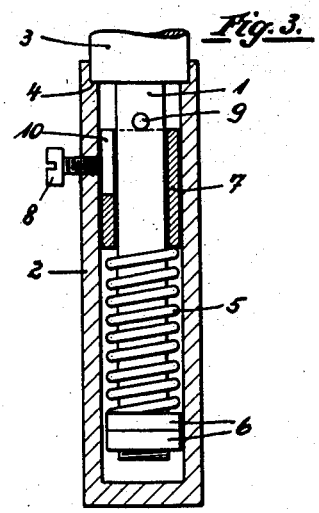
Figure 4:
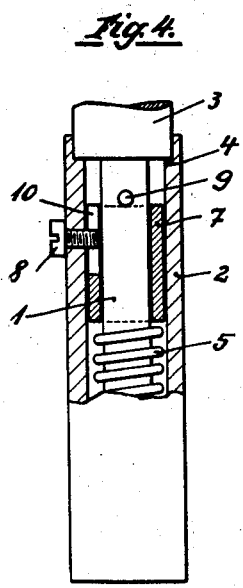
Figure 5:
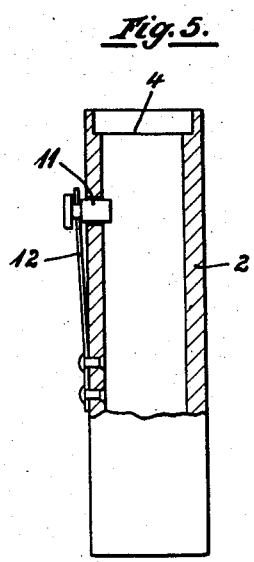
Figure 11:
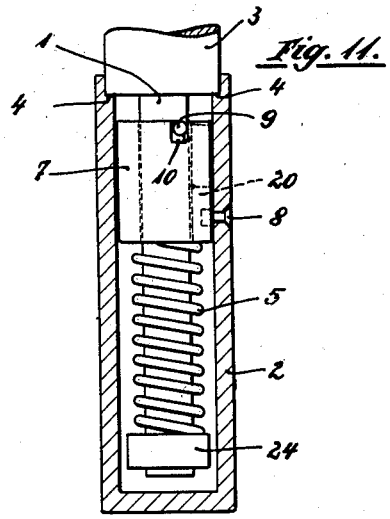
Figure 12:
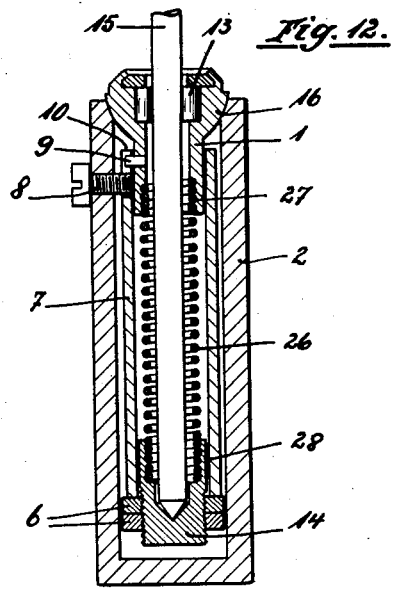

Figs. 1 to 11 show connections having a compression spring, and Fig. 12 shows a connection having a tension spring. More particularly, Fig. 1 is an axial section of a connection in which the shoulder on the shaft and the seat on the casing are flat, Fig. 2 is a detail showing the shaft, the spring and the clutching sleeve separately, Figs. 3 and 4 illustrate two distinct relative positions of the clutching sleeve and the shaft, Fig. 5 is an axial section of a casing with a spring catch for anchoring the clutching sleeve.

Figure 6:
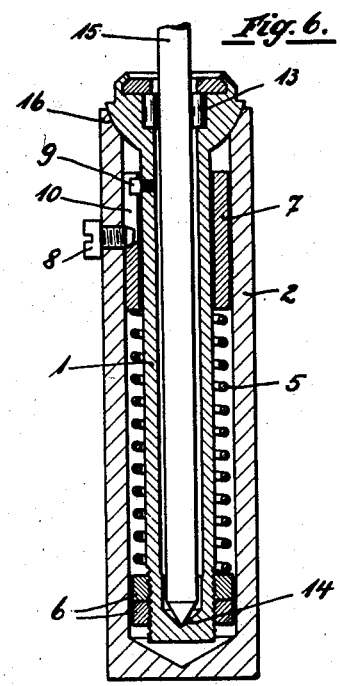
Figure 8:
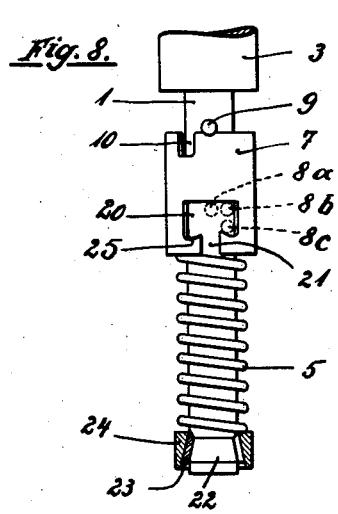
Figure 9:
Figure 10:
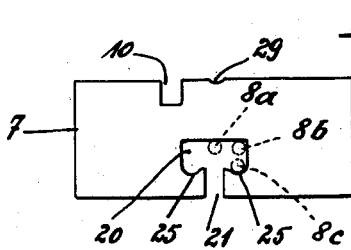
Figure 7:
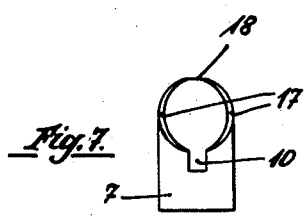

Fig. 6 is an axial section of a connection serving for supporting the end of a spindle for textile machinery, Fig. 7 is an elevation of a clutching sleeve with cam faces for engaging the lug on the shaft, Fig. 8 is a partly sectional elevation showing a clutching sleeve having a separate slot for the lug on the shaft and the pin on the casing, Fig. 9 is a plan view of a split ring on the inner end of the shaft for anchoring the spring, Fig. 10 shows the clutching sleeve in Fig. 8 flattened out, Fig. 11 is an axial section showing the shaft with the clutching sleeve illustrated in Figs. 8 and 10 inserted in the casing, and Fig. 12 is an axial section of the connection illustrated in Fig. 6 but equipped with a tension instead of a compression spring.

Referring now to the drawings and first to Figs. 1 to 4, the shaft 1 which may be solid or tubular, is inserted in a casing 2. 3 is a shoulder or collar at the outer end of the shaft, and 4 is a shoulder at the outer end of the casing.

Mounted to slide on the shaft 1 is a clutching sleeve 7. 5 is a compression spring on the shaft which bears on the inner end face of the sleeve with its outer end, and 6 is a double nut on the threaded inner end of the shaft on which the inner end of the spring is abutted. 10 is a slot in the sleeve 7 and 8 is a pin or check in the casing 2, here shown as a screw, which is adapted to enter the slot 10 and to anchor the sleeve 7 on the casing against rotation and axial displacement.

Fig. 1 shows the final position of the sleeve and the casing in which the inner end of the slot 10 bears on the pin 8. The reaction of the spring 5 acting on the double nut 6 pulls the shaft inwardly and applies the shoulder 3 to its seat 4 at the outer end of the casing under a pressure which is determined by the position of the nuts 6 on the threaded end of the shaft 1 and may be regulated by rotating the nuts. The nuts are concealed in the casing 2 after the connection has been assembled, and inaccessible from the outside. The open end of the casing is closed by the shoulder 3. 9 is a lug on the shaft 1 which is also adapted to enter the slot 10 but in the intermediate positions illustrated in Figs. 2 to 4 bears on the outer end face of the sleeve and holds it against axial displacement. A depression 29, Fig. 10, may be provided in the outer end face for the lug 9.

For assembling the shaft and the casing the spring 5 is compressed by shifting the sleeve 7 outwardly and rotating the sleeve or the shaft, or both, so that the lug 9 does not register with the slot 10 in the sleeve (Fig. 2). In this condition the shaft and the sleeve are inserted in the casing 2, Fig. 3. After the pin 8 has been retracted, the slot 10 is placed in line with the pin, the shaft with the sleeve is inserted and the pin is screwed home, so that it enters the slot 10 and holds the sleeve 7 against rotation with respect to the casing 2. Relative rotation of the casing 2 in which the sleeve takes part, and the shaft 1, now brings the lug 9 into registering relation to the slot 10 so that the spring 5 pushes the sleeve 7 outwardly as far as permitted by the pin 8, Fig. 1. The shaft 1 and the casing 2 are now held against axial displacement by the resilient pressure of the spring 5 and also against relative rotation since the pin 8 on the casing and the lug 9 on the shaft both engage in the slot 10 of the clutching sleeve 7. If it is desired to extract the shaft from the casing the pin 8 is retracted as shown in Fig. 3.

Referring now to Fig. 5, the threaded pin 8 is replaced by a spring catch 11, 12.

Referring now to Fig. 6, the shaft 1 is bored axially for the reception of a spindle 15 which may be part of a textile machine (not shown). The inner end of the spindle 15 is mounted to rotate in a stepped bearing 14 at the inner end of the hollow shaft 1. 13 is a roller bearing for the spindle at the outer end of the hollow shaft. The flat shoulder 3 and seat 4 illustrated in Figs. 1 to 5 are replaced by a spherical bearing 16 which permits the hollow shaft 1 to rock in the casing 2. The inner end of the threaded pin 8 is tapered and engages a correspondingly inclined face at the lower end of slot 10. By these means an axial component is exerted on the pin 8 by the reaction of the spring 5 which tends to hold the pin 8 against rotation and a simple and cheap safety device for the pin 8 is provided. Such an appliance is obviously particularly desirable in bearings which are subject to vibrations, as in the case of a bearing for a spindle, as shown, but obviously it may also be applied to other connections. If the shaft 1 is seated in a spherical bearing 16 at the upper end of the casing 1 evidently the pin 8 must not be screwed in too far as it would interfere with the rocking of the shaft.

Referring now to Fig. 7, the clutching sleeve 7 is equipped with the slot 10 as described but its squared outer end face is replaced by cam faces 17. Opposite the slot 10 the cam faces are connected by a short flat land 18 for the lug 9 to bear on when it is disengaged from the slot 10. When the shaft and the sleeve are ready to be inserted in the casing 2 the sleeve is rotated until the lug 9 bears on the flat land 18.

After the shaft has been inserted in the casing a very slight relative rotation of the shaft and the sleeve causes the lug 9 to slide into the slot 10 along one of the cam faces 17. A sleeve with cam faces is foolproof for if it is neglected to rotate the shaft after it has been inserted in the casing 2, the sleeve is automatically moved into its final position by vibration.

The modified sleeve illustrated in Figs. 8, 10 and 11, permits providing a fixed pin 8 in the casing 11. The sleeve 7 with the slot 10 is designed as described with reference to previous figures but the slot 10 cooperates only with the lug 9 while an auxiliary slot 20 having substantially the shape of the letter T is provided for cooperation with the fixed pin 8. The T-slot 20 has a short inlet 21 extending outwardly from the inner face of the sleeve 7 on which the spring 5 bears, with undercut recesses 25 at both sides of the inlet 21. Load is put on the spring 5 in the manner described and the shaft 1 with the sleeve 7 positioned as shown in Fig. 8, is inserted in the casing, the inlet 21 having been placed in line with the fixed pin 8. The central line of the T-slot 20 now coincides with the axis of the pin in the position 8a, Fig. 8. Rotation of the shaft first causes one of the sides of the T-slot to engage the pin 8, as shown for its right side at 8b in Fig. 8. Further rotation brings the slot 10 and the lug 9 into registering relation and the pressure of the spring 5 causes one of the undercut recesses 25 to engage the pin 8, position 8c in Fig. 8.

The double nut 6 shown in previously described figures is here replaced by a combination of a tapered groove 22 in the lower end of shaft 1, a tapered split ring 23 in the groove and a tapered sleeve 24 on the ring 23 on which the inner end of the spring 5 bears. The ring 23, if split, is resilient, but it may also consist of two independent parts.

Fig. 11 shows the final position of the connection, with the lug 9 in the slot 10 and the pin 8 in one of the recesses 25 at 8c.

Referring now to Fig. 12, this shows a bearing for a spindle 15 which is substantially similar to the bearing illustrated in Fig. 6 but modified in certain details because here the compression spring 5 is replaced by a tension spring 26. The shaft 1 only extends inwardly as far as 27 where the outer end of the spring 26 is secured in it. 28 is a sleeve at the outer end of the step bearing 14 in which the other end of the spring 26 is secured. The sleeve 7 is slotted at 10, as described, for cooperation with the lug 9 and the pin 8 but extends inwardly as far as the double nut 6 on the step bearing 14.

For assembling the connection the clutching sleeve 7 is shifted on the shaft 1 in the manner described with reference to Fig. 2, and the lug 9 and the slot 10 are moved out of aligned relation. The tension of the spring applies the outer end face of the sleeve to the lug 9 on the shaft 1. The shaft and the sleeve are inserted in the casing 2 in the manner described and the sleeve 7 is anchored on the casing by the pin 8. The pull of the spring 26 applies the bottom of the slot 10 to the pin 8 and at the same time holds the spherical seat at the upper end of the sleeve 1 applied to its seating face at the outer end of the casing 2.

It is understood that the several means which have been illustrated in the several figures, are not limited to the particular type of connection for which they have been shown. Thus the spring catch 11, 12 illustrated in Fig. 5 may replace the pin 8 in any one of the modifications illustrated, the provision of a plain slot 10 and a T-slot 20 as shown in Figs. 8, 10 and 11, is not limited to a connection having a compression spring and a tapered sleeve instead of a double nut on the shaft; and so on.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. In a plug- and socket-connection, a plug, a socket adapted to receive said plug, means for holding said members against relative axial displacement in a given direction, resilient means secured to said plug at one end for keeping said holding means engaged, a clutching sleeve mounted to rotate and to slide on said plug, with the free end of said resilient means engaging said clutching sleeve, means for anchoring said clutching sleeve against axial displacement and rotation with respect to said socket, and means for alternately holding said sleeve against axial displacement and rotation with respect to said plug.

2. In a plug- and socket-connection, a plug, a socket adapted to receive said plug, means for holding said members against relative axial displacement in a given direction, resilient means for keeping said holding means engaged, adjustable means for securing one end of said resilient means on said plug, a clutching sleeve mounted to rotate and to slide on said plug, with the free end of said resilient means engaging said clutching sleeve, means for anchoring said clutching sleeve against axial displacement and rotation with respect to said socket, and means for alternately holding said sleeve against axial displacement and rotation with respect to said plug.

3. In a plug- and socket-connection, a plug, a socket adapted to receive said plug, means for holding said members against relative axial displacement in a given direction, resilient means for keeping said holding means engaged, adjustable means for securing one end of said resilient means on said plug, said securing means being so arranged as to be concealed by said socket when the members are assembled, a clutching sleeve mounted to rotate and to slide on said plug, with the free end of said resilient means engaging said clutching sleeve, means for anchoring said clutching sleeve against axial displacement and rotation with respect to said socket, and means for alternately holding said sleeve against axial displacement and rotation with respect to said plug.

4. In a plug- and socket-connection, a plug, a socket adapted to receive said plug, means for holding said members against relative axial displacement in a given direction, resilient means secured to said plug at one end for keeping said holding means engaged, a clutching sleeve mounted to rotate and to slide on said plug, with the free end of said resilient means engaging said clutching sleeve, means for anchoring said clutching sleeve against axial displacement and rotation with respect to said socket, and a lug on said plug for alternately holding said sleeve against axial displacement and against rotation with respect to said plug.

5. In a plug- and socket-connection, a plug, a socket adapted to receive said plug, means for holding said members against relative axial displacement in a given direction, resilient means secured to said plug at one end for keeping said holding means engaged, a slotted clutching sleeve mounted to rotate and to slide on said plug, with the free end of the resilient means engaging one end of said clutching sleeve, a lug on said plug adapted to register with the slot in said sleeve in a definite relative angular position of said plug and said sleeve, and means on said socket adapted to enter said slot for anchoring said sleeve against axial displacement and rotation with respect to said socket.

6. In a plug- and socket-connection, a plug, a socket adapted to receive said plug, means for holding said members against relative axial displacement in a given direction, resilient means secured to said plug at one end for keeping said holding means engaged, a clutching sleeve mounted to rotate and to slide on said plug, with the free end of said resilient means engaging said clutching sleeve, movable means for anchoring said clutching sleeve against axial displacement and rotation with respect to said socket, and means for alternately holding said sleeve against axial displacement and rotation with respect to said plug.

7. In a plug- and socket-connection, a plug, a socket adapted to receive said plug, means for holding said members against relative axial displacement in a given direction, resilient means secured to said plug at one end for keeping said holding means engaged, a slotted clutching sleeve mounted to rotate and to slide on said plug, with the free end of the resilient means engaging one end of said clutching sleeve, a lug on said plug adapted to register with the slot in said sleeve in a definite relative angular position of said plug and said sleeve, said sleeve having an auxiliary slot with an inlet extending in parallel to its axis from the inner end face of said sleeve, undercut recesses at opposite sides of said inlet, and a fixed pin on said socket adapted to enter said inlet and to be engaged by said recesses for anchoring said sleeve against axial displacement and rotation with respect to said socket.

8. In a plug- and socket-connection, a divided plug, a socket adapted to receive said plug, means for holding said members against relative axial displacement in a given direction, a tension spring connected to the outer part of said divided plug at one end, and to the inner part at the other, a slotted clutching sleeve mounted to rotate and to slide on the outer part of said plug, with its inner end abutted on the inner part of said plug, a lug on the outer part adapted to register with the slot in said sleeve in a definite relative angular position of said outer part and said sleeve, and means on said socket adapted to enter said slot for anchoring said sleeve against axial displacement and rotation with respect to said socket.

WILHELM STAHLECKER.